Patented June 1, 1943

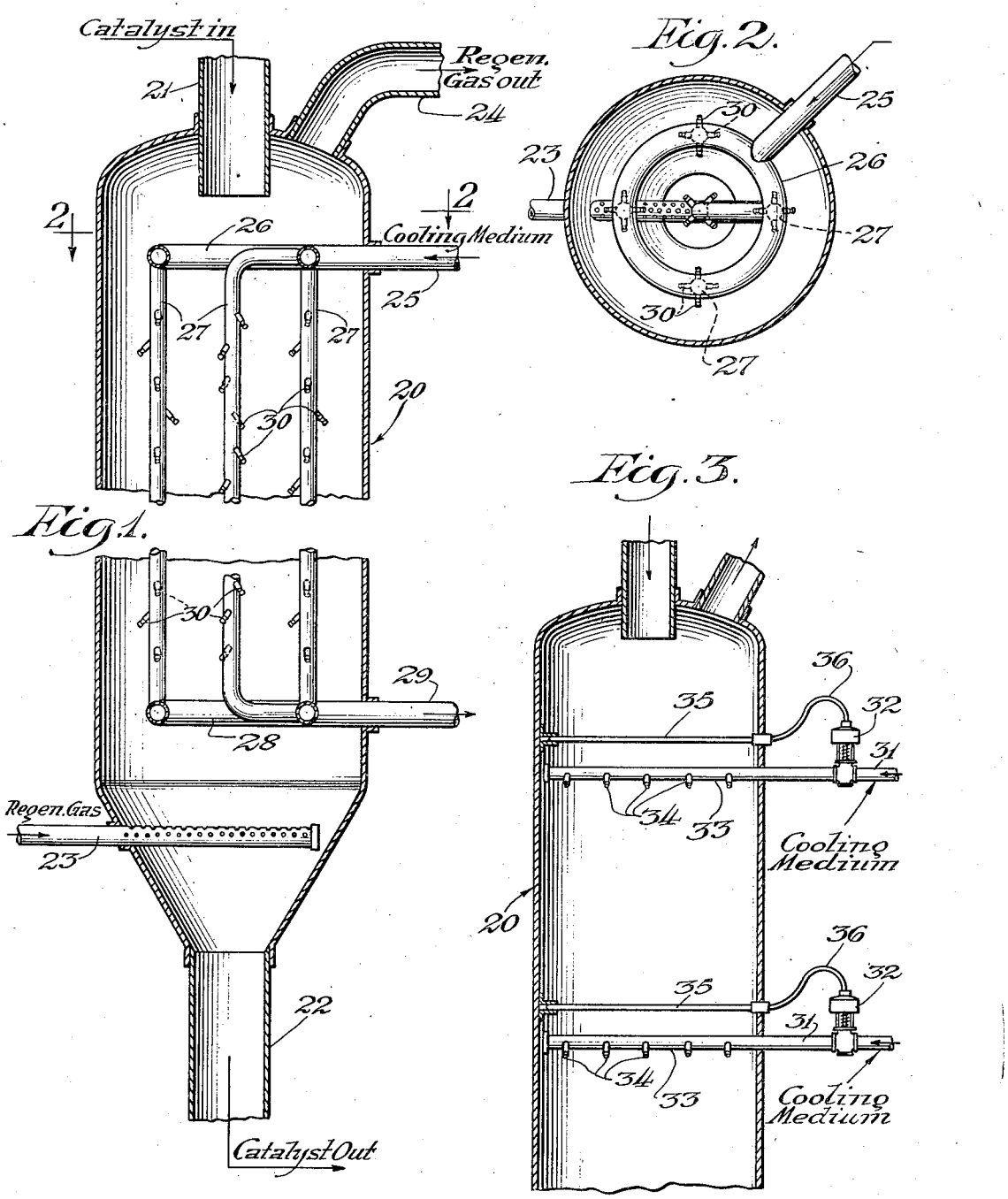

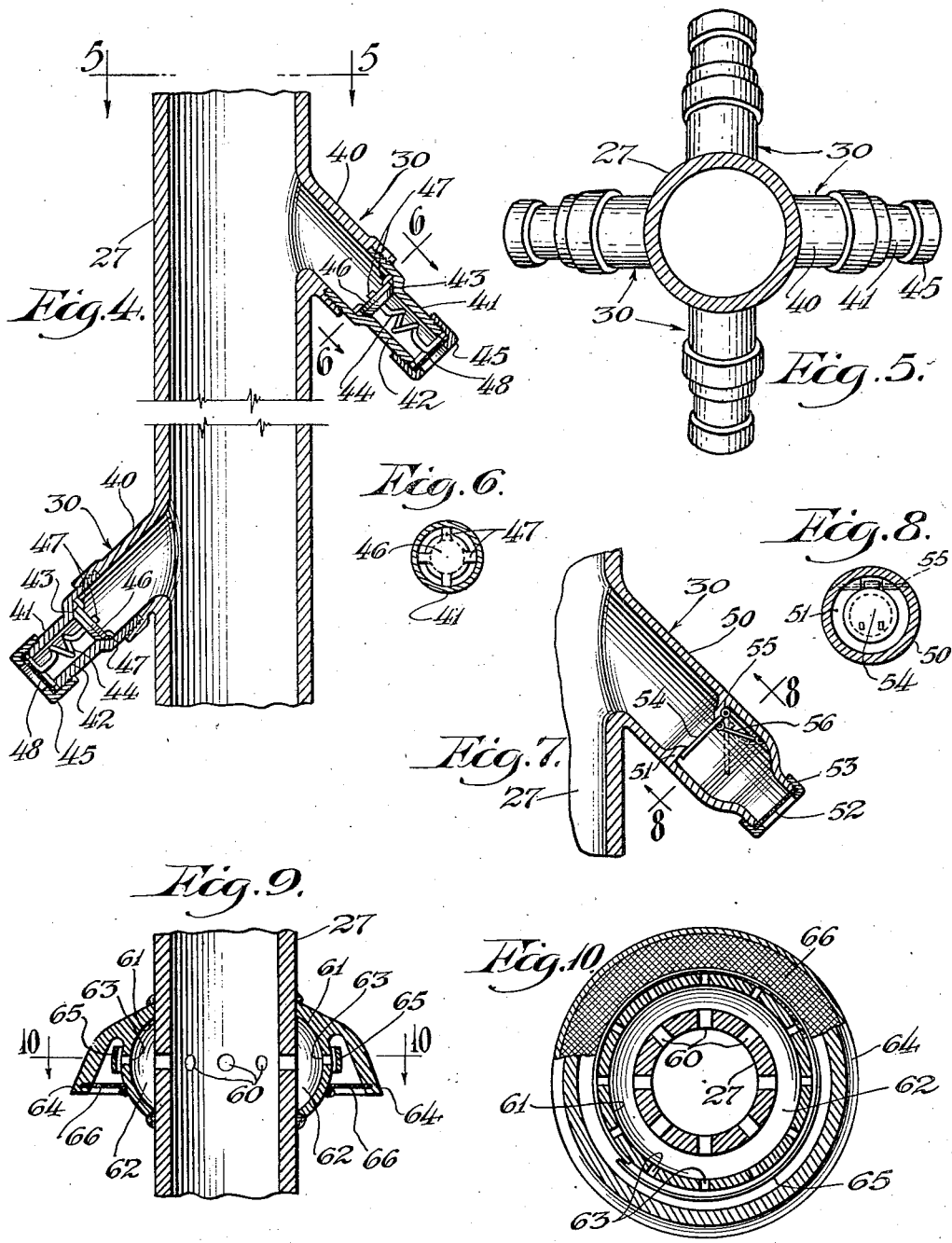

2,320,562

UNITED STATES PATENT OFFICE 2,320,562

REGENERATION APPARATUS

David W. Bransky, Chicago, Ill., assignor to Standard Oil Company, Chicago, Ill., a corporation of Indiana Application December 20, 1940, Serial No. 370,943

7 Claims. (Cl. 23—288)

This invention relates to the regeneration of comminuted materials such as catalysts, decolorizing clays and the like, and more particularly to apparatus for regenerating such materials by treatment with oxygen-containing gases without danger of overheating.

In the catalytic conversion of hydrocarbons and in the refining of petroleum and the like with clays and analogous materials, the activity of the solid material is sooner or later reduced to a relatively low value by reason of the accumulation of carboniferous deposits thereon. It is customary in most cases to regenerate the comminuted, i. e., powdered or granular, material by burning off these deposits with an oxygen-containing gas such as air, alone or diluted with inert gas or flue gas.

One of the great dangers of this procedure, however, is that local "hot spots" may develop in the bed of material being regenerated, and that such local overheating will progress gradually from the bottom to the top of the bed, thus ruining the activity of a large proportion of the active material by sintering or other inactivating changes.

Many methods of temperature control have been devised, but none has been completely effective because of the local nature of the overheating. For example, it has been proposed to introduce a cooling fluid such as a relatively cool flue gas into the regeneration apparatus to cool the overheated portion of the bed. Unfortunately the concomitant effect has been excessive cooling of the whole bed, and greatly increased regeneration time.

I have devised an apparatus which solves the problem of overheating while overcoming the disadvantages of the prior methods hereinabove stated. In brief my invention contemplates the provision of means for supplying a cooling fluid to the bed of material being regenerated and means for regulating the supply of fluid selectively and automatically to those levels at which overheating exists. In this way there is practically no interference with the regeneration operation and "hot spots" are quickly eliminated.

It is an object of my invention, therefore, to provide a novel, simple and efficient regenerating apparatus of the type described, including means for preventing overheating of the material undergoing regeneration. Another object is to provide an automatic emergency cooling means for vessels used in the regeneration or "burning" of catalysts, decolorizing clays and similar powdered and granular material. Further objects, advantages and uses of my invention will become apparent from the following detailed description thereof read in conjunction with the drawings in which:

Figure 1 shows in simplified vertical section an apparatus according to my invention;

Figure 2 is a sectional view along line 2—2 of Figure 1;

Figure 3 is a partial sectional view of another form of apparatus according to my invention;

Figure 4 is a sectional view showing a portion of one of the internal tubes of Figure 1 and a suitable form of valve arrangement;

Figure 5 is a cross-section along line 5—5 of Figure 4;

Figure 6 is a cross-section along line 6—6 of Figure 4;

Figure 7 shows an alternative valve construction to that illustrated in Figure 4;

Figure 8 is a cross-section along line 8—8 of Figure 7;

Figure 9 shows in vertical section the details of still another port and valve construction which can be used on the internal tubes of Figure 1; and Figure 10 is a cross-section along line 10—10 of Figure 9 which has been partly cut away to show the screen.

My invention and its mode of operation can best be understood from consideration of the drawings, to which reference is now made. In Figure 1 a regeneration vessel 20 is shown which is of the vertical type provided with an inlet 21 and an outlet 22 for the comminuted material undergoing regeneration. Of course elements 21 and 22 must have some control means associated therewith but these can be conventional and form no part of my invention. It is only essential that a bed of comminuted material be present in vessel 20 during the regeneration operation and that gases be prevented from leaving vessel 20 through inlet 21 or outlet 22. The regeneration can be a batch operation or it can be a continuous one with the bed slowly moving from inlet 21 to outlet 22. The oxygen-containing regenerating gas enters the vessel through a distributing device such as perforated pipe 23, and passes through the bed up vessel 20 to outlet 24.

In the form of my invention shown in Figure 1 a cooling fluid, which can be an inert liquid but which is preferably a relatively cool inert gas such as flue gas, is supplied through conduit 25 to upper header 26, thence through vertical tubes 27 and lower header 28, and finally out of the system through conduit 29. Tubes 27 are distributed throughout the interior of vessel 20, for instance, as shown in Figure 2. This particular arrangement is a very advantageous one since the circulating gas prevents undue heating of the tubes and headers, but header 28 and conduit 29 are not necessary if tubes 27 are constructed of sufficiently heat-resistant materials. Each of the tubes 27 is provided with a plurality of spaced thermostatic valve units 30 at various points along it, each unit being arranged to discharge cooling fluid from the interior of the tube 27 into the bed of comminuted material only when the temperature in the vicinity exceeds a predetermined value. These valve units 30 can be of a number of different designs, some of which will be hereinafter fully described. Preferably they are directed obliquely downward as shown in order to aid in preventing their being fouled by the material in the surrounding bed.

It will be apparent from the above that wherever "hot spots" appear in the bed being regenerated the cooling fluid is automatically and selectively released, thus preventing its continuance and spread throughout any substantial portion of the comminuted material under treatment. Generally overheating will occur substantially simultaneously throughout the cross-section of the bed at approximately the same level, so that in the arrangement of Figures 1 and 2, valve units 30 on all of the tubes 27 at that level will simultaneously release cooling fluid into the bed. Because of this fact, however, it is possible to use the alternate construction shown in simplified form in Figure 3.

In Figure 3 the vessel 20 is only partially shown, but is the same as that of Figure 1 with the same facilities for handling comminuted solids and regenerating gases. The cooling fluid, however, is supplied through lines 31 under control of diaphragm-type control valves 32 to substantially horizontal header pipes 33 bearing a plurality of spaced nozzles 34. Just above pipes 33 are tubes 35 closed at one end and communicating with valves 32 at the other by means of lines 36, this system being filled with a suitable non-volatile liquid. The arrangement is such that an excessive average temperature at or slightly below either of the tubes 35 causes the liquid to expand, thereby opening valve 32 and allowing cooling fluid to be released at the desired level through nozzles 34. In order that this automatic emergency cooling means may be wherever needed within vessel 20, a plurality of such devices are located at various levels, and only those actually in the sphere of influence of the "hot spot" operate, the others remaining unaffected.

Figures 4, 5 and 6 show in detail one form of valve unit 30 that can be applied to the tubes 27 illustrated in Figure 1. In each such valve unit there is a tubular member 40 directed obliquely downward and having attached thereto by means of threads a valve casing 41 with a restricted portion 42, thus forming a shoulder 43 acting as a valve seat. A helical bimetallic valve-actuating member 44 has its lower end firmly clamped to casing 41 by means of a threaded ring 45, and has attached to its upper end a valve 46 which cooperates with shoulder 43 and is kept properly centered by means of guides 47. A screen 48 is also held by ring 45 across the fluid outlet to assist in protecting the valve mechanism from the material being regenerated. Bimetallic member is arranged so that it will tend to increase in length as the temperature rises and will lift valve 46 from seat 42 when the temperature exceeds a predetermined value.

Figures 7 and 8 show an alternative construction in which valve unit 30 consists of a tubular casing 50 having an internal restriction 51 therein serving as a valve seat and a screen 52 over its outlet held in place by threaded ring 53, the purpose of screen 52 being to aid in preventing comminuted material from entering unit 30 and hindering its valve action. The valve 54 itself is hinged at point 55 and is actuated by a bimetallic strip 56 having one end attached to valve 54 near its hinged support and the other to the interior of casing 50. Bimetallic strip 56 has the property of bending or springing into a curved shape when a temperature in excess of the desired temperature is reached, thus opening valve 54 to the position shown in dotted lines and allowing cooling fluid to flow into the surrounding bed.

Figures 9 and 10 illustrate another alternative construction of a different type. Tube 27 has a number of perforations 60 at each of a plurality of levels. Opposite each of these levels a special ring 61 is attached, for example by spot welding, ring 61 being of a shape such that there is an annular space 62 formed between it and the exterior of tube 27. Ring 61 also has a number of perforations 63 therein and an overhanging portion 64 to keep the solid material of the bed from interfering with the valve mechanism. This mechanism is very simple and consists merely of a curved bimetallic strip 65 securely attached at one end and covering the perforations 63. When the temperature becomes excessive strip 65 merely assumes a larger radius of curvature, thus allowing cooling fluid to escape from tube 27. The reason for having annular space 62 is that this tends to insulate the temperature-responsive strip 65 from tube 27 and makes it more sensitive to temperature changes in the vicinity. Valve strip 65 is further protected by screen 66 extending inwardly from overhanging portion 64 of ring 61.

It will be readily seen from the above that I have devised a novel, simple and efficient apparatus for regenerating comminuted materials without danger of overheating. Many modifications can readily be made by those skilled in the art in the light of this disclosure, and I do not therefore desire to be limited to the specific embodiments of my invention hereinbefore described by way of example but only by the scope of the appended claims.

I claim:

1. In apparatus for regenerating catalysts, decolorizing clays and the like by subjecting them to treatment at an elevated temperature with an oxygen-containing gas in order to remove carboniferous deposits therefrom including a regeneration vessel having means for introducing and withdrawing solid material, means for introducing said gas into the lower portion of said vessel and means for withdrawing combustion gases from the upper portion of said vessel, the improvement which comprises means for supplying a cooling fluid to said vessel at each of a plurality of levels therein, valve means arranged to control the flow of said fluid into said vessel at each of said levels, and separate means responsive to the temperature at each of at least some of said levels for actuating selectively the valve means associated with said fluid-introducing means at substantially the same level.

2. In combination, a vessel adapted to hold a bed of a comminuted material, means for introducing said material into said vessel and removing it therefrom, means for introducing an oxygen-containing gas into said vessel and withdrawing combustion products therefrom, means at each of a plurality of levels for supplying a cooling fluid to the interior of said vessel at those of said levels at which the temperature exceeds a predetermined value and thermally-responsive means for controlling said cooling fluid supply means.

3. In combination, a vessel adapted to hold a bed of a comminuted material, means for introducing said material into the upper portion of said vessel and removing it from the lower portion thereof, means for introducing an oxygen-containing gas into the lower portion of said vessel, means for removing combustion products from the upper portion of said vessel, means for supplying a cooling fluid to the interior of said vessel at several substantially horizontally spaced points at each of a plurality of levels therein, and thermally-responsive control means adapted to allow said fluid to flow through said supplying means only at those levels at which the temperature exceeds a predetermined value.

4. In combination, a vessel adapted to hold a bed of a comminuted material, means for introducing said material into the upper portion of said vessel and removing it from the lower portion thereof, means for introducing an oxygen-containing gas into the lower portion of said vessel, means for removing combustion products from the upper portion of said vessel, a plurality of horizontally spaced tubes mounted substantially vertically within said vessel, means for supplying a cooling fluid to each of said tubes, means spaced along each of said tubes for allowing said fluid to flow from the interior of said tubes to said bed of comminuted material, and valve means associated with each of said spaced means adapted to open only when the temperature in the vicinity thereof exceeds a predetermined value.

5. Apparatus according to claim 4 wherein each of said valve means includes a bimetallic temperature-responsive element.

6. The combination of claim 4 wherein each of said spaced means is a nozzle directed obliquely downward and containing said valve means, and said valve means includes a bimetallic temperature-responsive element.

7. The combination of claim 4 wherein each of said spaced means includes a member having a plurality of circumferentially spaced perforations therethrough, and said valve means includes a bimetallic element adapted to cover said perforations substantially completely when the temperature thereof is below a predetermined value and to uncover said perforations when said value is exceeded.

DAVID W. BRANSKY.